United States Patent [19]

Crosby

[11] 4,070,290

[45] Jan. 24, 1978

[54] CENTRIFUGE WITH TORSIONAL VIBRATION SENSING AND SIGNALING

[75] Inventor: Herbert L. Crosby, Plainville, Mass.

[73] Assignee: Bird Machine Company, Inc., South Walpole, Mass.

[21] Appl. No.: 663,906

[22] Filed: Mar. 4, 1976

[51] Int. Cl.² .................... B01D 29/00

[52] U.S. Cl. .................... 210/91; 210/138; 210/144; 210/360 A; 233/1 C; 233/19 R

[58] Field of Search .................... 210/85, 91, 87, 144, 210/148, 360 A, 363, 137, 138; 55/274, 418; 233/1 C, 1 B, 28, 45, 19 R, 7

[56] References Cited

U.S. PATENT DOCUMENTS

| | | | |
|---|---|---|---|
| 523,105 | 7/1894 | Chamman | 233/1 C |
| 1,166,370 | 12/1915 | Herr | 210/87 |
| 2,534,268 | 12/1950 | Kahn et al. | 210/144 X |
| 3,081,027 | 3/1963 | Coulson | 233/38 |
| 3,368,747 | 2/1968 | Lavanchy et al. | 233/45 X |
| 3,822,201 | 7/1974 | Waters | 210/85 X |

*Primary Examiner*—John Adee

*Attorney, Agent, or Firm*—Edgar H. Kent

[57] ABSTRACT

A solids-liquid separating centrifuge with bowl and conveyor members rotated about a common axis at a differential speed has means for sensing torsional vibration of at least one of the members about its axis and providing an output representative of the vibration amplitude, and signal means which provides an indicative signal when the output indicates vibration amplitude above a predetermined level. The indicative signal may operate an alarm, or an automated centrifuge throughput reducing system, or both.

13 Claims, 8 Drawing Figures

FIG 1a
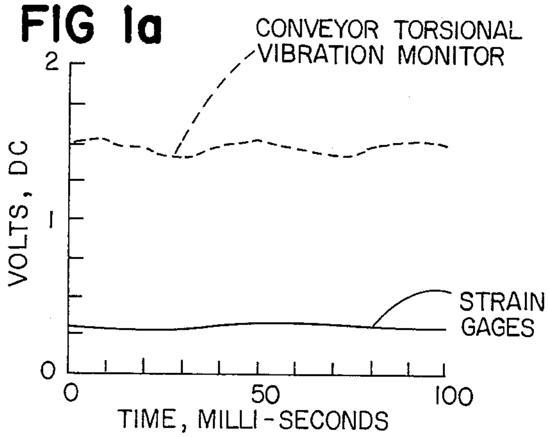
LIGHT LOAD - NO CHATTER
FIG 1b
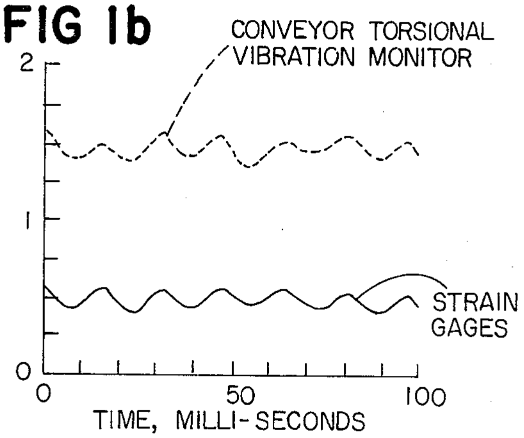
LIGHT CHATTER
FIG 1c
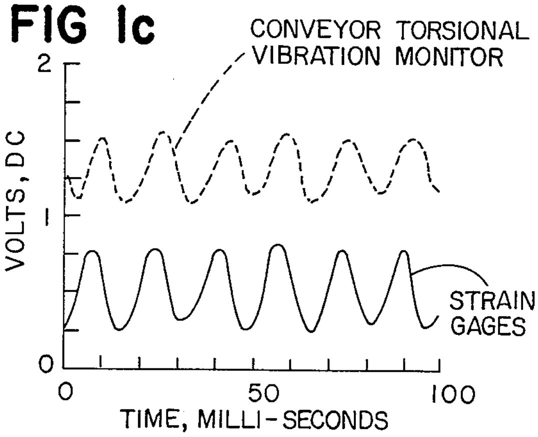
MODERATE CHATTER
FIG 1d
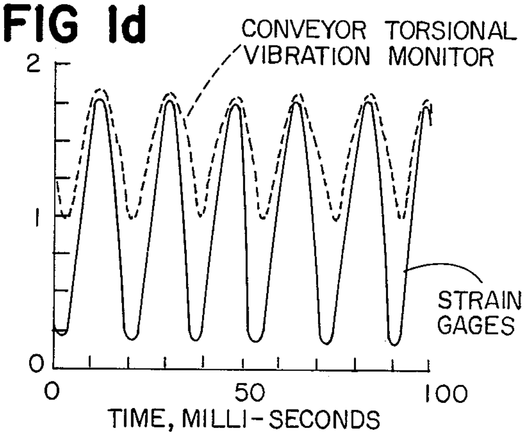
FULL CHATTER
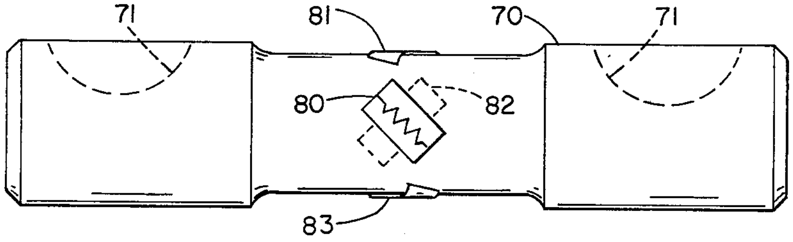
FIG 3
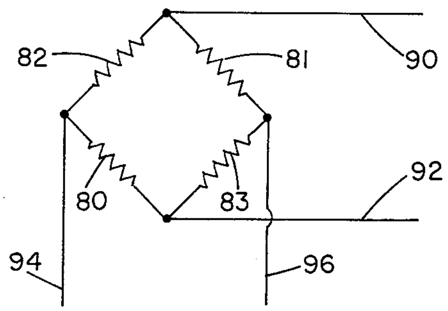
FIG 4

CENTRIFUGE WITH TORSIONAL VIBRATION SENSING AND SIGNALING

BACKGROUND OF THE INVENTION

1. Field of the Invention

This invention relates to solids-liquid separating centrifuges of the continuous type in which a bowl, imperforate or perforate, and a conveyor are rotated about a common axis in the same direction but at a differential speed. More particularly, the invention concerns the provision of such centrifuges with a system for sensing the existence of excessive torsional vibration and providing a control initiating signal.

2. Description of the Prior Art

Centrifuges of the type concerned, particularly when used with certain types of materials, are subject to relative rotational or torsional vibration between the bowl and conveyor, a condition commonly referred to as "chatter". The high frequency torque fluctuations produced by chatter, typically 20 to 60 cycles per second, are of large amplitude at high throughputs with resultant strain on and fatigue of the differential gearing commonly used between bowl and conveyor, and torque overload shearpins. The consequent shortened life of these components is expensive both because the gears are costly to replace, and because of machine down time while either gears or shearpins are replaced. U.S. Pat. No. 3,685,722 discloses a flexible connection system between the conveyor and the gearing which desirably reduces the amplitude of chatter but even with machines having this improvement chatter may still be a problem at high throughputs, which a user may wish to obtain.

Despite extensive studies, the exact causes of chatter may not be fully known. Since excessive chatter is most frequently encountered with slurries of solids of a sticky nature such as starch, sewage sludge and PVC, chatter is generally assumed to be caused by irregular conveying of the solids in a series of stick-slip motions. The phenomenon is not necessarily predictable even for a given machine operating at given parameters on a given slurry, since it may suddenly occur due, apparently, to a fluctuation in slurry concentration or content or feed rate. Once excessive chatter is encountered, it is usually necessary to reduce throughput drastically in order to eliminate chatter or reduce it to acceptable proportions.

It has been known in the prior art to translate chatter into an electrical output of correspondingly fluctuating amplitude by means of appropriately located strain gages, piezoelectric accelerometers or the like, this fluctuating output being observable on an oscilloscope. Such a system, used mainly in laboratory studies, has been used to monitor chatter in centrifuges operating in production in the field. Such a system is expensive, since it requires substantially constant attention of an operator to the oscilloscope, so that he can take appropriate steps to reduce throughput, usually by reducing feed rate, when the amplitude of the observed fluctuations of the wave indicative of chatter becomes excessive in his judgment. In most cases, centrifuge operators either take the consequences of excessive chatter at desired high throughputs, or maintain a much lower throughput than would otherwise be desirable at which excessive chatter is unlikely to occur.

SUMMARY OF THE INVENTION

An object of this invention is to provide, in centrifuges of the type concerned, a system for continually sensing the amplitude of chatter and providing an indicative signal when that amplitude exceeds an acceptable value.

Another object is to provide such a system in which the indicative signal operates one or more audible or visual alarms.

A further object is to provide in such a system, adjustment means responsive to the indicative signal to automatically reduce throughput of the machine in increments until the sensed amplitude of the chatter has been reduced below the unacceptable level.

Still other objects are to provide such means which is similarly responsive to torque overload also sensed by the system, to provide the system with a chart recorder for maintaining a running record of the sensed chatter, and to provide such a system which is easily applied to existing centrifuges of the type concerned.

In accordance with the invention, chatter may be sensed by strain gages located on an extension of the first stage pinion of the differential gearing which is rigidly secured to the torque arm. Such gages, in this location, which operate by changed resistance to passage of direct electric currents and are commonly used for measuring torque, are also satisfactory for sensing the amplitude of chatter for purposes of this invention, and are relatively inexpensive compared to other sensors that could be used. When chatter occurs, it appears as a high frequency fluctuation (commonly between 10 and 70 Hz) of the direct current passing the gages, such fluctuation being proportional to the amplitude of the chatter. The current is amplified in a high gain amplifier and the amplitude of its fluctuating component is determined by a suitable measuring device such as an A.C. voltmeter capacitor-coupled to the amplifier to convert the fluctuating component to A.C. The voltmeter is equipped to close an electric circuit providing an indicative signal when the amplitude reaches, and so long as it stays at or above, an unacceptable level.

The indicative signal may be used only to operate an alarm which will notify an operator of the condition, so that he may take appropriate steps to reduce chatter. In a preferred embodiment, however, adjustment means are provided responsive to the indicative signal to automatically reduce throughput of the machine, most effectively to reduce feed rate, in increments, so long as the circuit providing the indicative signal remains closed. A first warning alarm may also be operated to notify an operator that a change is imminent and a second alarm to notify him that it is taking place. In this embodiment, the mean amplitude of the torque-measuring direct current from the gages may also be determined, for example, by a D.C. voltmeter coupled through a filter, which provides in similar manner to the A.C. voltmeter an indicative signal of torque overload, to which signal the adjustment means is also responsive in like manner, reducing throughput until the mean torque load reaches an acceptable level.

BRIEF DESCRIPTION OF THE DRAWINGS

In the drawings:

FIGS. 1A, 1B, 1C and 1D are reproductions of photographs of oscilloscope traces showing development of chatter in a centrifuge of the type concerned;

FIG. 3 is an enlarged side elevation view of the strain gage mounting pin shown in FIG. 2 and the gages thereon;

FIG. 4 is a wiring diagram of the strain gages of FIGS. 2 and 3;

DESCRIPTION OF THE PREFERRED EMBODIMENTS

FIGS. 1A–1D illustrate the development of chatter in a centrifuge of the type concerned as reproductions of actual oscilloscope traces of the amplified electrical outputs from two different sensing devices. The lower trace was produced by strain gage sensors, of the type shown and subsequently described herein, located on the torque arm extension of the first stage gear pinion of the differential gearing. The upper trace was produced by a "torsional vibration monitor" connected to the centrifuge conveyor. This device had a gear rotated with the conveyor to pass 4,000 teeth per second past a magnetic pickup to generate a 4,000 Hz electric signal. The 4,000 Hz was filtered out, leaving a signal corresponding to the amplitude and frequency of the modulation produced by torsional vibration.

In FIG. 1A, where the machine is idling, the two traces show only slight torsional vibration with no chatter. In FIG. 1B, with feed started, torsional vibration becomes more apparent as light chatter. In FIG. 1C, throughput has been increased to the point where torsional vibration has developed into moderate chatter, which borders on being intolerable, and in FIG. 1D further increased throughput has caused a high, destructive chatter level which should be avoided or promptly reduced if attained. Similar traces made with the "torsional vibration monitor" connected to the bowl instead of the conveyor showed a similar pattern but with the amplitude of bowl vibration much lower. The strain gage sensor is preferred as it, unlike the torsional vibration monitor, senses mean torque as well as torque variations, and is also less expensive.

Figure 2:
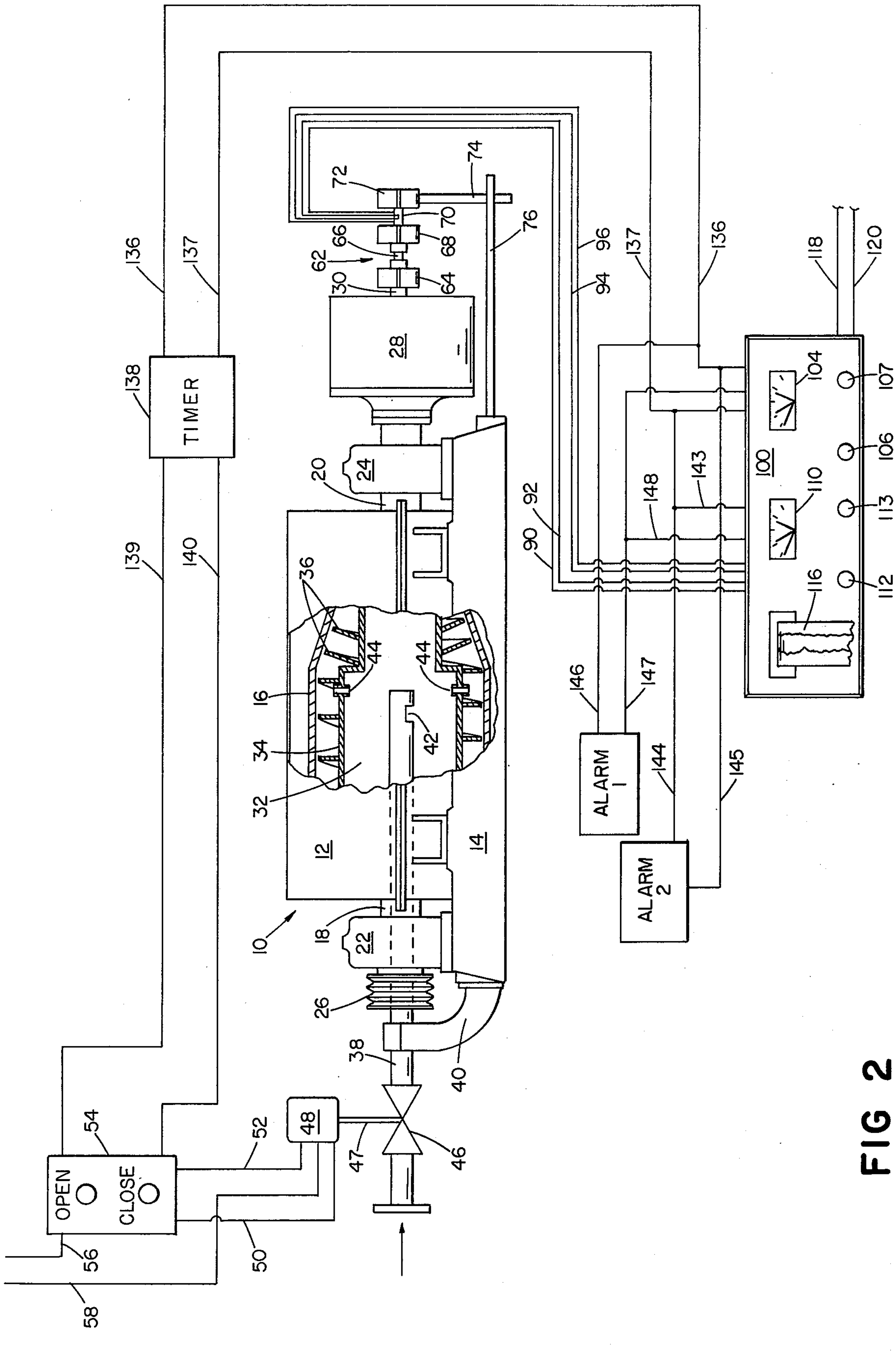
FIG. 2 is a partially diagrammatic side elevation view, cut away and in longitudinal section in part, of a centrifuge provided with a sensing and control system according to the invention.

The centrifuge designated generally 10 in FIG. 2 is of a conventional solid or screen bowl continuous type, having a casing 12 mounted on a base 14. Within the casing, bowl 16 is rotatably mounted by means of hollow end shafts 18, 20 extending through bearing pedestals 22, 24 respectively. Shaft 18 has a drive pulley 26 fixed to its outer end from which the bowl is rotated by drive belts from a motor (not shown). Shaft 20 is fixed to the casing 28 of a gear box which rotates with the shaft and contains the speed change gearing, not shown except that the outer end of the first stage pinion shaft is indicated at 30. This gearing may be of the common planetary reduction type disclosed in U.S. Pat. No. 1,962,461 in which the first stage pinion shaft is fixed.

A conveyor designated generally 32 is coaxially mounted within bowl 16 by means of end shafts (not shown) mounted in bearings (not shown) in shafts 18 and 20, the right hand such shaft in FIG. 2 being connected to the reduction gearing so that it is rotated thereby in the same direction as the bowl but at a slightly slower speed. Conveyor 32 has a hollow hub 34 on which helical conveyor blade 36 is mounted which conveys the solids settling on the bowl from left to right in FIG. 2, out openings (not shown) in the frusto-conical bowl and into a suitable receiving system (not shown) in the casing 12. The liquid overflows ports (not shown) in the lefthand end of the bowl in FIG. 2 into a suitable receiving system (not shown) in the casing 12.

The lefthand conveyor or shaft is hollow as is bowl shaft 18 so that a feed pipe 38, fixed to an arm 40 on base 14 and connected to a slurry feed source (not shown) may extend therethrough, pipe 38 having an outlet 42 in hub 34, the feed slurry discharging to the bowl via ports 44 in hub 34. A throttle valve 46 in pipe 38 is operated by shaft 47 of a reversible electric motor 48 connected by lines 50, 52 to an open and close manual switch 54, connected by line 56 to one side of an electric power source, the other side of which is connected by line 58 to the motor, so that open and close operations of the switch reverse the direction of current through the motor coils to effect opposite operations thereof.

Pinion shaft 30 has fixed thereto an assembly designated generally 62 and constituting an extension thereof. Assembly 62 consists of a clamp 64 clamped to shaft 30 and to one end of a shear pin 66 the other end of which is clamped by clamp 68 to one end of a bar 70 the other end of which is clamped by clamp 72 to one end of a torque arm 74, the other end of which bears against a restraining bar 76 fixed to base 14 to prevent rotation of the assembly and shaft 30. The torque on shaft 30 is therefore transmitted to the assembly.

As shown in enlarged detail in FIG. 3, bar 70 has attached thereto four strain gage sensors 80, 81, 82 and 83, arranged 90° apart about the axis of bar 70, with sensors at opposite sides of the bar axis oppositely inclined at an angle of 45° to that axis. Sockets 71 indicated by dash lines are provided at the ends of bar 70 for engagement by mating parts on clamps 68 and 72 respectively. Bar 70 beyond shearpin 66, rather than the shearpin itself, is utilized as the mounting for the strain gages to protect them from damage in the event of shearpin breakage, and to this end bar 70 is resistant to breakage under forces which will cause shearpin failure. Transducer quality single element foil strain gages are preferred.

FIG. 4 shows diagrammatically how the gages may be electrically connected so that detected strains due to torsional loading are added while those due to bending are negated. In a shaft loaded in torsion, the compressive and tension stresses are at right angles to each other and 45° to the axis of the shaft. Bending produces tension and compressive forces at opposite sides of the shaft. With the arrangement of gages shown, if the shaft side having the gage arranged to detect tension is under tension due to bending away from that side, the oppositely arranged gage at the opposite side will detect a substantially equal offsetting compressive force. If the bending is in the opposite direction, that is toward the side with the tension detecting gage, neither the tension nor the compressive forces of bending will be detected. The gages are connected in a bridge circuit having input circuit lines 90, 92 and output circuit lines 94, 96, with the oppositely mounted pairs of gages connected in series between the input circuit lines as shown in FIG. 4. If the electrical resistance of either gage 80 or 83 arranged to detect tension has a change factor due to tension produced by bending, this will be offset by an opposite resistance change in its opposite compressive force measuring gage 82 or 81 in series with it. On the other hand, the effects of torsional tension on the resistances of the tension detecting gages 80 and 83, connected in parallel, are added.

Figure 5:
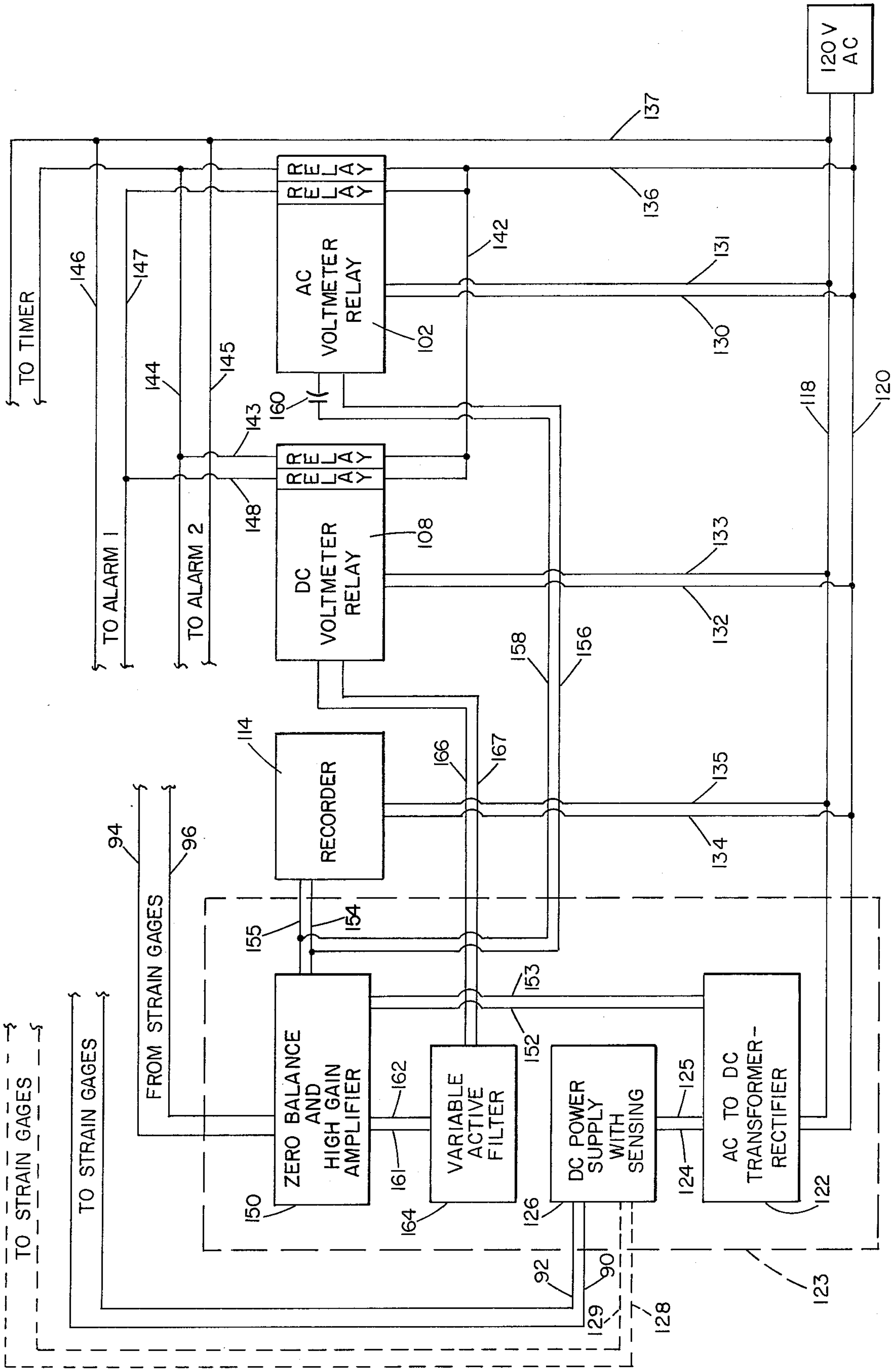
FIG. 5 is a block circuit diagram of electrical devices used in FIG. 2.

Referring now to FIGS. 2 and 5, a control cabinet with front panel 100 houses various instrumentation of the detection and control circuitry. This instrumentation includes an A.C. voltmeter 102 having a visual indicator dial 104 with one indicator needle and two set needles, the set needles adjusted by knobs 106, 107; a like D.C. voltmeter 108 with dial 110 and set needle adjustor knobs 112, 113; and a pen chart recorder 114 with an oscillating writing head and a motor which unrolls the chart paper 116 on which the trace is produced. The voltmeters are meter relays in which two relays are operated to close respectively controlled circuits while the indicator needle is at or above the voltage indicated by the corresponding set needle. Various makes of such meters are available, General Electric Company's Meter Relays Type 195 or Type 196 being suitable. The recorder also need not be of special design, and may, for example, be a "Rustrak Model 388 Two Channel Recorder" of Rustrak Instrument Division, Gulton Industries, Inc.

Conductors 118, 120 from a 120 volt A.C. power source are connected to A.C. to D.C. Transformer-Rectifiers 122, shown within a rectangular dash line 123 because they, and the other components hereinafter described enclosed within line 123, suitable for use in the disclosed system, are commercially available as a unit, for example, in the Honeywell "Accudata 218 Bridge Amplifier" or the BLH Electronics, Inc. "Bridge Amplifier". The converted voltage is applied via conductors 124, 125 to a D.C. Power Supply With Sensing 126 which further reduces and regulates the D.C. voltage to a desired value, usually 10 volts, which is applied to the input lines 90, 92 of the strain gages as shown in FIGS. 2 and 4. Additional output conductors 128, 129 to the gages are shown in dash lines in FIG. 5 and not shown in FIGS. 2 and 4 because their use is optional though advantageous for close control of the voltage applied to the gages, desirably within ±0.1%. Conductors 128, 129, when used, are connected to the gages in parallel with conductors 90, 92 and are connected to relatively high resistance, so that the current flowing through them is very small. Therefore, changes in resistance due to external factors such as temperature variations will have little effect on the amount of current flowing through conductors 128, 129 but a relatively large effect on the amount of current flowing through conductors 90, 92. Conductors 128, 129 therefore function as a reliable sensing circuit of the voltage at the gages, changes in which due to external factors are sensed and used to make corrective changes in the power supply to maintain a constant voltage at the gages. Such a sensing and control system is included in the commercially available units mentioned above which have the components enclosed in dash lines 123.

Conductors 118, 120 from the A.C. source are connected by conductors 130, 131 to operate the relays of A.C. Voltmeter Relay 102, by conductors 132, 133 to operate the relays of D.C. Voltmeter Relay 108, and by conductors 134, 135 to operate the motor of Recorder 114. (If these instruments operate on D.C., connections can be made instead to transformer-rectifiers 122). Conductors 136 and 137 are connected between the A.C. power source and a timer 138 (FIG. 2) which they operate to close a normally open switch (not shown) between a conductor 139 connected to line 56 and a conductor 140 connected to line 52, thus completing a circuit from line 56 through the motor to line 58 which operates motor 48 in the direction to close feed valve 46.

Timer 138 is of a type which is operated when circuit is made thereto through conductors 136 and 137 to close the circuit through conductors 139 and 140 for only a short interval, then to open the circuit for a relatively long interval, then to reclose and repeat until the circuit through conductors 136 and 137 is interrupted. In this manner, valve 46 may be closed in increments sufficiently spaced in time so that the effect of each adjustment may be reflected in the indicator systems. Such timers are commercially available and may be two timers of the respective selected time ranges connected together to work in alternation, such as two "Cycl-Flex" Reset Timers, HP5 Series (e.g., HP517 and HP53), produced by the Eagle Signal Division of The E. W. Bliss Company.

Conductor 136 includes a normally open switch (not shown) closed by one of the relays of A.C. Voltmeter Relay 102 while the indicating needle of the voltmeter is at or above the voltage indicated by its corresponding set needle, this being set at a voltage corresponding to an unacceptable level of chatter, so that the circuit to Timer 138 is then made. A shunt circuit comprising conductors 142, 143 and 144 extends from conductor 136 through a like switch closed by the corresponding relay of D.C. Voltmeter 108 to close the circuit through lines 136 and 137 to Timer 138 when its voltmeter indicating needle is at or above a voltage corresponding to an unacceptable mean torque level indicated by its set needle. Conductor 144 is also connected to an alarm designated "Alarm 2" which is connected by conductor 145 to conductor 137, so that Alarm 2 is operated whenever the circuit is closed to Timer 138 to notify an operator that a feed rate change to reduce chatter is taking place.

Conductor 137 is connected by conductor 146 to another alarm designated "Alarm 1". Alarm 1 is connected to conductor 136 by a conductor 147 connected to shunt circuit conductor 142 through a normally open switch (not shown) controlled by the other relay of A.C. Voltmeter Relay 102, and also connected to conductor 142 by branch conductor 148 which also has an unshown normally open switch controlled by the other relay of D.C. Voltmeter relay 108. The set needles corresponding to these other relays are set at somewhat lower voltages than the set needles for the relays controlling the circuits to Timer 138 and Alarm 2, so that the circuit to Alarm 1 will be closed before these other circuits are closed to warn an operator that an automatic feed change may be imminent, so that he can take over manual control if he wishes.

The electric current from the strain gages on lines 94, 96 is supplied to a Zero Balance and High Gain Amplifier 150 which is one of the components within dash line 123. This component contains bridge circuitry which is balanced at the zero strain condition of the resistances through the gages, and is powered by conductors 152, 153 from Transformer-Rectifiers 122. Its amplified output goes via conductors 154, 155 to control the writing head of recorder 114 and via branch conductors 156, 158, the latter including capacitor 160, to control the indicator needle of A.C. Voltmeter Relay 102, and via conductors 161, 162 to Variable Active Filter 164 (another component within line 123) which is connected via conductors 166, 167 to control the indicator needle of D.C. Voltmeter Relay 108. Capacitor 160 functions to convert the fluctuating direct current from the amplifier into A.C., while filter 164 functions to filter out the fluctuation so that the D.C. voltmeter indicates the mean D.C. from the gages. The filter 164 may suitably be a single ended filter which passes only frequencies below 10Hz, while capacitor 160 may suitably be in the 0.02 to 5.0 microfarad range.

Thus, when the amplified fluctuating current from the gages, translated into correspondingly fluctuating A.C. voltage by capacitor 160 and the voltmeter of A.C. Voltmeter Relay 102, reaches an amplitude indicative of unacceptable chatter (e.g. at or below that indicated in FIG. 1C) as set by its set needle, the circuit will be closed through conductors 136 and 137 by the related relay of A.C. Voltmeter Relay 102 to operate Alarm 2 and to incrementally close feed valve 46 until the indicator needle drops below the set needle, or until an operator takes over manual control. The same chain of events will occur if the mean voltage indicated by the indicator needle of D.C. Voltmeter Relay 108 shows excessive torque, at or above the limit set into its voltmeter by its set needle. Preceding either of the foregoing operations, Alarm 1 will be operated through the closing of its circuit by the related relay of the active Voltmeter-Relay. The voltmeters may be conveniently calibrated on a scale of inch pounds of torque shown on their dials. Recorder 114 keeps a continual visible record of the magnitude of the current from the gages and the amplitude of its fluctuations.

Either or both of the alarms, or the feed valve closing circuitry and one alarm, can be omitted from the preferred system illustrated, and either or both the D.C. voltmeter and the recorder may also be omitted, although the use of all has advantages and is preferred. It will be noted that the feed valve control system operates only to close the valve. A similar system could be provided for operating motor 48 in the opposite direction to open the feed valve when the mean voltage or fluctuation amplitude reach low levels indicated by an additional set needle on the respective voltmeter dials. However, such a system could result in too much undesirable hunting and it is believed better to leave valve opening to the operator once the chatter has been reduced to acceptable proportions. The use of one or more alarms will alert the operator to that end.

I claim:

1. In solids-liquid separating centrifuge apparatus of the type which includes a rotary bowl member and a rotary conveyor member mounted therein, drive means for rotating said members about a common axis at a differential speed, and feed means for feeding solids-liquid slurry to said bowl member, the improvement comprising:

means for sensing torsional vibration only of at least one of said members about its axis and providing an output which varies in accordance with the sensed vibration;

signal means connected to said output for measuring the amplitude of said variations thereof and providing an indicative signal when said amplitude is representative of vibration amplitude above a predetermined level; and means responsive to said signal for adjusting the solids throughput of said apparatus, said adjusting means including feed rate control means.

2. Apparatus according to claim 1 in which said output is electrical.

3. Apparatus according to claim 2 which includes an alarm and means rendered operative by said indicative signal for actuating said alarm.

4. Apparatus according to claim 2 wherein said feed rate control means reduces the rate of feed of slurry to said bowl member by said feed means.

5. Apparatus according to claim 4 wherein said signal means continues to provide said indicative signal while said output is representative of vibration amplitude above the predetermined level and said feed rate control means includes timed means for reducing said rate of feed in timed increments so long as said indicative signal continues.

6. Apparatus according to claim 5 wherein said timed means includes a throttle valve in the feed line to said apparatus, a motor for operating said valve and timer means for intermittently operating said motor in the direction closing said valve.

7. Apparatus according to claim 2 wherein said output is representative of the torque exerted on at least one of said members, and which includes additional signal means connected to said output and said adjustment means for rendering said adjustment means operative for reducing the throughput of the apparatus when said output is representative of a torque overload.

8. Apparatus according to claim 2 which also includes means connected to said output for producing a chart recording of said output.

9. Apparatus according to claim 2 wherein said drive means includes differential gearing and said sensing means includes strain gages on a shaft connected to said gearing.

10. Apparatus according to claim 2 wherein said signal means comprises a voltmeter relay.

11. Apparatus according to claim 10 wherein said electrical output is fluctuating direct current and said voltmeter relay is capacitor-coupled to said output.

12. Apparatus according to claim 2 wherein said signal means provides another output signal when said output is representative of a vibration amplitude above another lower predetermined level, and which includes an alarm and means rendered operative by said other output signal for actuating said alarm.

13. Apparatus according to claim 12 which includes two alarms and means rendered operative by said respective output signals for operating said respective alarms.

* * * * *